United States Patent
Donaldson et al.

(10) Patent No.: US 8,306,949 B2
(45) Date of Patent: *Nov. 6, 2012

(54) METHOD AND SYSTEM FOR COPYING A FILE USING A PORTABLE ELECTRONIC DEVICE

(75) Inventors: Jesse Donaldson, San Jose, CA (US); David Creemer, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/552,467

(22) Filed: Sep. 2, 2009

(65) Prior Publication Data

US 2009/0327365 A1  Dec. 31, 2009

Related U.S. Application Data

(63) Continuation of application No. 10/021,494, filed on Oct. 30, 2001, now Pat. No. 7,899,778.

(51) Int. Cl.
*G06F 17/00* (2006.01)
(52) U.S. Cl. ........................ 707/621; 707/682
(58) Field of Classification Search .......... 707/609–627, 707/682, 683, 633–641; 439/76.1
See application file for complete search history.

(56) References Cited

U.S. PATENT DOCUMENTS

| 6,442,570 | B1 | 8/2002 | Wu |
| 6,538,698 | B1 | 3/2003 | Anderson |
| 6,671,567 | B1 * | 12/2003 | Dwyer et al. ................ 700/94 |
| 6,691,149 | B1 | 2/2004 | Yokota et al. |
| 7,003,327 | B1 * | 2/2006 | Payne et al. .................. 455/566 |
| 2002/0035574 | A1 | 3/2002 | Dumas |
| 2002/0112237 | A1 | 8/2002 | Kelts |
| 2003/0065805 | A1 | 4/2003 | Barnes, Jr. |
| 2003/0171944 | A1 | 9/2003 | Fine et al. |
| 2004/0032393 | A1 | 2/2004 | Brandenberg et al. |
| 2004/0048503 | A1 * | 3/2004 | Mills et al. .................. 439/76.1 |

OTHER PUBLICATIONS

Microsoft Dictionary, Microsoft Press 3rd edition, definitions of Identifier, Icon, flash card, memory card, 1997.*

Computer Dictionary, Microsoft Press, 3RD Edition, p. 247, Copy Right 1997.

* cited by examiner

*Primary Examiner* — Wilson Lee

(57) ABSTRACT

A method, system and computer-usable medium for copying a file are disclosed.

A plurality of location identifiers are stored that include a location identifier of a removable memory and a location identifier of a memory of a portable electronic device. A file is stored in a memory of the portable electronic device, where the file is associated with the location identifier of the memory. In response to a user interaction with a user interface of the portable electronic device, the location identifier of the removable memory is associated with the file, where the user interaction includes a user selection of the file to copy. In response to the associating the location identifier of the removable memory with the file, the file is copied from the memory of the portable electronic device to the removable memory.

47 Claims, 13 Drawing Sheets

METHOD AND SYSTEM FOR COPYING A FILE USING A PORTABLE ELECTRONIC DEVICE

RELATED APPLICATIONS

The present application is a continuation of U.S. patent application Ser. No. 10/021,494, filed Oct. 30, 2001, entitled "CATEGORY BASED USER INTERFACE FOR MANAGEMENT OF AUXILIARY STORAGE FOR A PORTABLE COMPUTER SYSTEM," naming Jesse Donaldson and David Creemer as inventors, assigned to the assignee of the present invention. This application is incorporated herein by reference in its entirety and for all purposes.

BACKGROUND OF THE INVENTION

As the continuing advances in technology have enabled the further miniaturization of the components required in building computer systems, new categories of portable electronic devices and computer systems have been created. One of the newer categories of computer systems developed has been the portable, hand held, or "palmtop" computer system, commonly referred to as a personal digital assistant or PDA. Other examples of a palmtop computer system include electronic address books, electronic day planners, electronic schedulers and the like.

A palmtop computer system is a computer that is small enough to be held in the user's hand and as such is "palm-sized." As a result, palmtops are readily carried about in the user's briefcase, purse, and in some instances, in the user's pocket. By virtue of its size, the palmtop computer, being inherently lightweight, is therefore exceptionally portable and convenient.

To support the diminutive form of the palmtop computer, certain components and functions normally associated with full-sized computers have been reduced or redesigned to facilitate portable use. To conform with the size limitations of the palmtop computer, the hard drive, the component normally utilized for data storage, has been generally replaced with quantities of RAM (random access memory), ROM (read only memory), and with removable memory, e.g., flash memory, etc.

Conforming to the size of the palmtop computer, new types of media cards have been developed for the PDA. These new media cards are called auxiliary add-in cards, or are also called secure digital, SD cards, Compact Flash (CF), or multimedia cards or MMCs, or memory sticks. These media cards are inserted into the PDA through an accessible expansion slot thereby providing a mechanism to add functions to a PDA while continuing to conform to the size restrictions of the PDA. The advantage of having an expansion slot is the ability to use the auxiliary add-in cards for providing the PDA with an almost endless array of different information and applications. SD and MMC add-in cards, by virtue of their size, (at approximately 32 mm long by 24 mm wide by 2.4 mm thick, are just slightly larger than a postage stamp) are easily carried by the user, and are also convenient to use.

Many users are familiar with the "copy" and "paste" functions used on a desktop computer to copy and move files from one place to another. For example, on a desktop computer, one can copy a file from a floppy disk and paste it onto the hard drive of the computer to make an identical copy of the file. The actual mechanism that facilitates the copy function can be a "drag and drop" function using a graphical user interface. However, many file structures used on a palmtop computer do not incorporate a "desktop analogous" method for managing data between the main memory on the palmtop device and a removable memory card associated with the palmtop device.

SUMMARY OF THE INVENTION

To appreciate the convenience of using expansion cards on a portable electronic device, a user friendly method of file sharing is presented. It would be advantageous to create a file structure on a palmtop computer that is easily recognizable to the user and requires little training to learn and that can be used to copy information between a main memory of a palmtop device and a removable memory card.

Accordingly, embodiments of the present invention provide a file structure for use with removable memory (expansion cards) that is operable with some existing functions existing already on a palmtop computer. The present invention further provides a method for sharing information on an expansion card with a palmtop computer. More specifically, an embodiment of the present invention provides a method for filing the information on an expansion card as a category of the palmtop computer.

In embodiments of the present invention, the files of an expansion card can be assigned to a special category or categories that are associated with external memory storage. In one implementation, applications that are on a PDA can be copied to a removable storage unit by changing the category the applications are assigned. For example, a game that is stored on the main memory of a PDA (category "games") can be copied to a removable memory card by simply changing the category the game is in to indicate a predetermined category associated with the removable card (e.g., category "removable card1"). In one embodiment, the user has the option to keep the application in two categories. For example, after copying a game from the PDA to a removable memory card, the user can decide if the game will remain on the PDA or it will be removed therefrom.

Likewise, an application that is resident on a memory card can be copied to the memory of the PDA by changing its category name to a category associated with the PDA, e.g., "games." The present invention also provides a user interface that can be used to easily change the category of the application. In one implementation, categories that are associated with external memory cards have a special visual indication to denote the external memory storage. Additionally, icons that are related to applications within categories that are associated with external memory cards can also be displayed with a special visual indicator denoting the external storage thereof.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Figure 1:
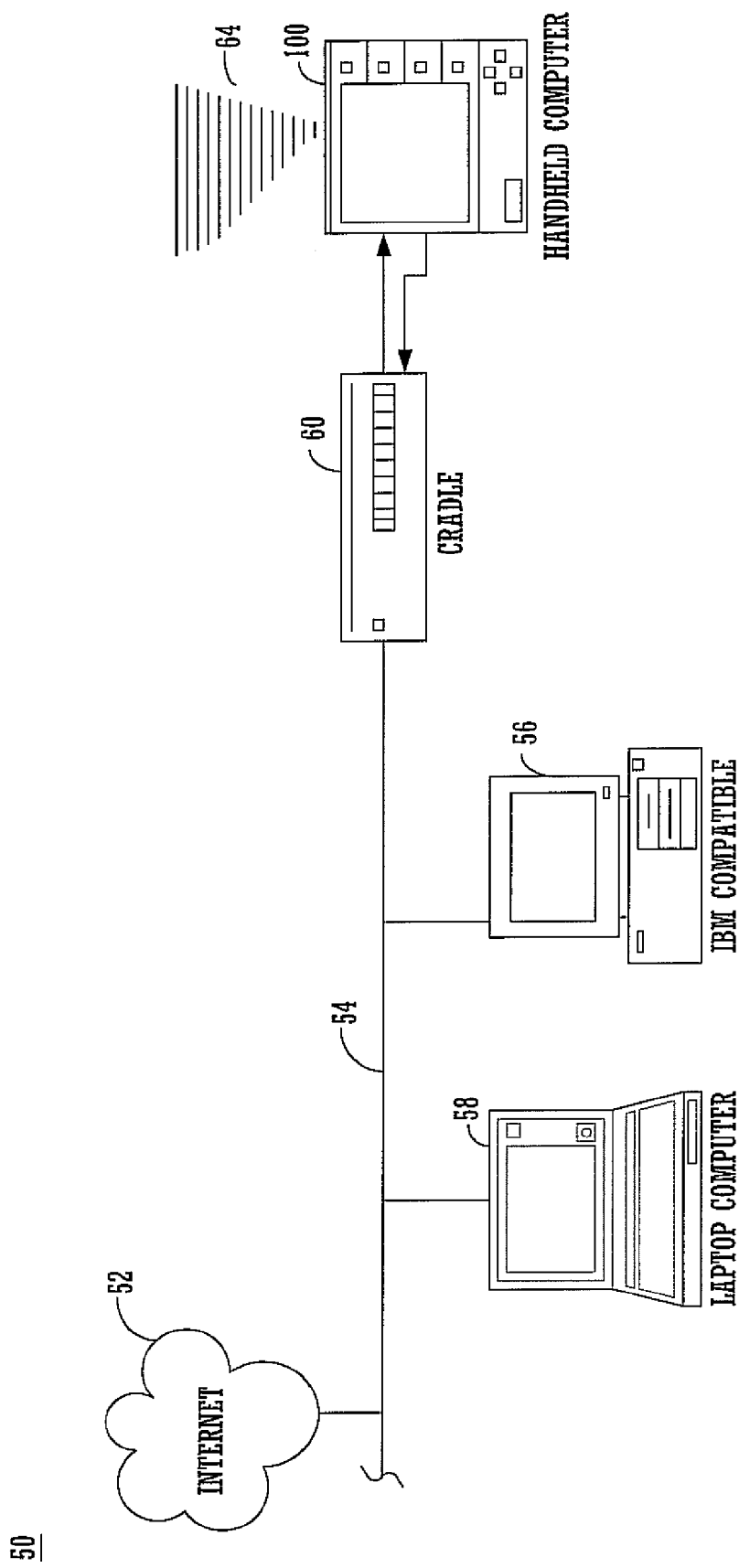
FIG. 1 is a system illustration of an exemplary Personal Digital Assistant computer system connected to other computer systems and the Internet via a cradle device in accordance with one embodiment of the present invention.

In the following detailed description of the present invention, a system and method for dynamically generated configuration datasheet; numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "aborting," "accepting," "accessing," "adding," "adjusting," "analyzing," "applying," "assembling," "assigning," "associating," "balancing," "blocking," "calculating," "capturing," "combining," "comparing," "collecting," "configuring," "copying," "creating," "debugging," "defining," "delivering," "depicting," "detecting," "determining," "displaying," "downloading," "establishing," "executing," "forwarding," "flipping," "generating," "grouping," "hiding," "identifying," "initiating," "instantiating," "interacting," "modifying," "monitoring," "moving," "outputting," "parsing," "performing," "placing," "presenting," "processing," "programming," "querying," "removing," "rendering," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

Referring now to FIG. 1, a communication network or system 50 that may be used in conjunction with embodiments of the present invention is shown. It is appreciated that the method and system for a category based user interface for management of auxiliary storage can be used in conjunction with any computer system and that system 50 is exemplary only. It is further appreciated that the portable computer system 100 described below is only exemplary.

System 50 comprises a host computer system 56 which can either be a desktop unit as shown, or, alternatively, can be a laptop computer system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc. Optionally, bus 54 can provide communication with the Internet 52 using a number of well-known protocols. Additionally, computer 100 can be connected to telephone network by a wired or wireless communications channel which in one embodiment can be a telephone line, but could be of any number of well-known designs. From this channel, Internet access can be established.

Bus 54 may also be coupled to a cradle 60 for receiving and initiating communication with a personal digital assistant computer system 100. Cradle 60 provides an electrical and mechanical communication interface between bus 54 (and anything coupled to bus 54) and computer system 100 for two-way communications. Computer system 100 also contains a wireless communication mechanism 64 for sending and receiving information from other devices. The wireless communication mechanism 64 can use infrared communication or other wireless communications such as a Bluetooth protocol.

Figure 2A:
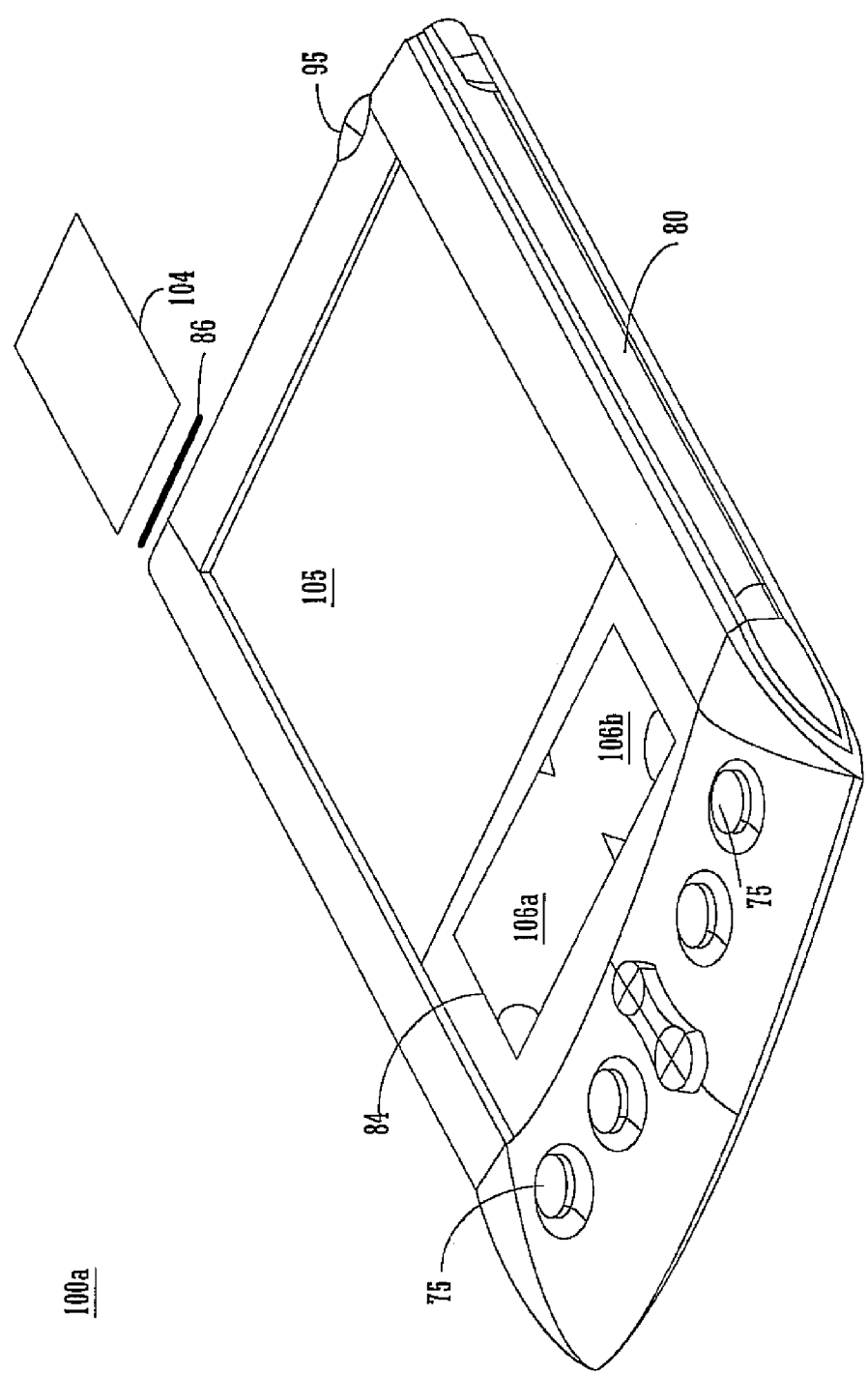
FIG. 2A is a top-side perspective view of an exemplary Personal Digital Assistant computer system in accordance with one embodiment of the present invention.

With reference to FIG. 2A, a perspective illustration of the top face 100a of exemplary personal digital assistant computer system 100 is shown. Top face 100a contains a display screen 105 surrounded by a bezel or cover. A removable stylus 80 is also shown. Display screen 105 is a touch screen capable of registering contact between the screen and the tip of stylus 80. Stylus 80 can be fabricated of any material which can make contact with screen 105. Top face 100a also contains one or more dedicated and/or programmable buttons 75 for selecting information and causing computer system 100 to implement functions. An on/off button 95 is shown as well.

A removable memory device 104 may be inserted into a receiving slot (expansion slot) 86 of the computer system 100. The expansion slot 86 can be located in any position, along any edge or face of the computer system 100. In FIG. 2A, the slot is shown in the upper left corner (along the top edge) as only one example.

Referring still to FIG. 2A, a handwriting recognition pad or "digitizer" containing regions 106a and 106b is also shown. Specifically, region 106a is for the drawing of alpha characters therein for automatic recognition and region 106b is for the drawing of numeric characters therein for automatic recognition. Stylus 80 is used for stroking a character within one of the regions 106a and 106b. The stroke information is then fed to an internal processor for automatic character recognition. Once characters are recognized, they are typically displayed on screen 105 for verification and/or modification.

Figure 2B:
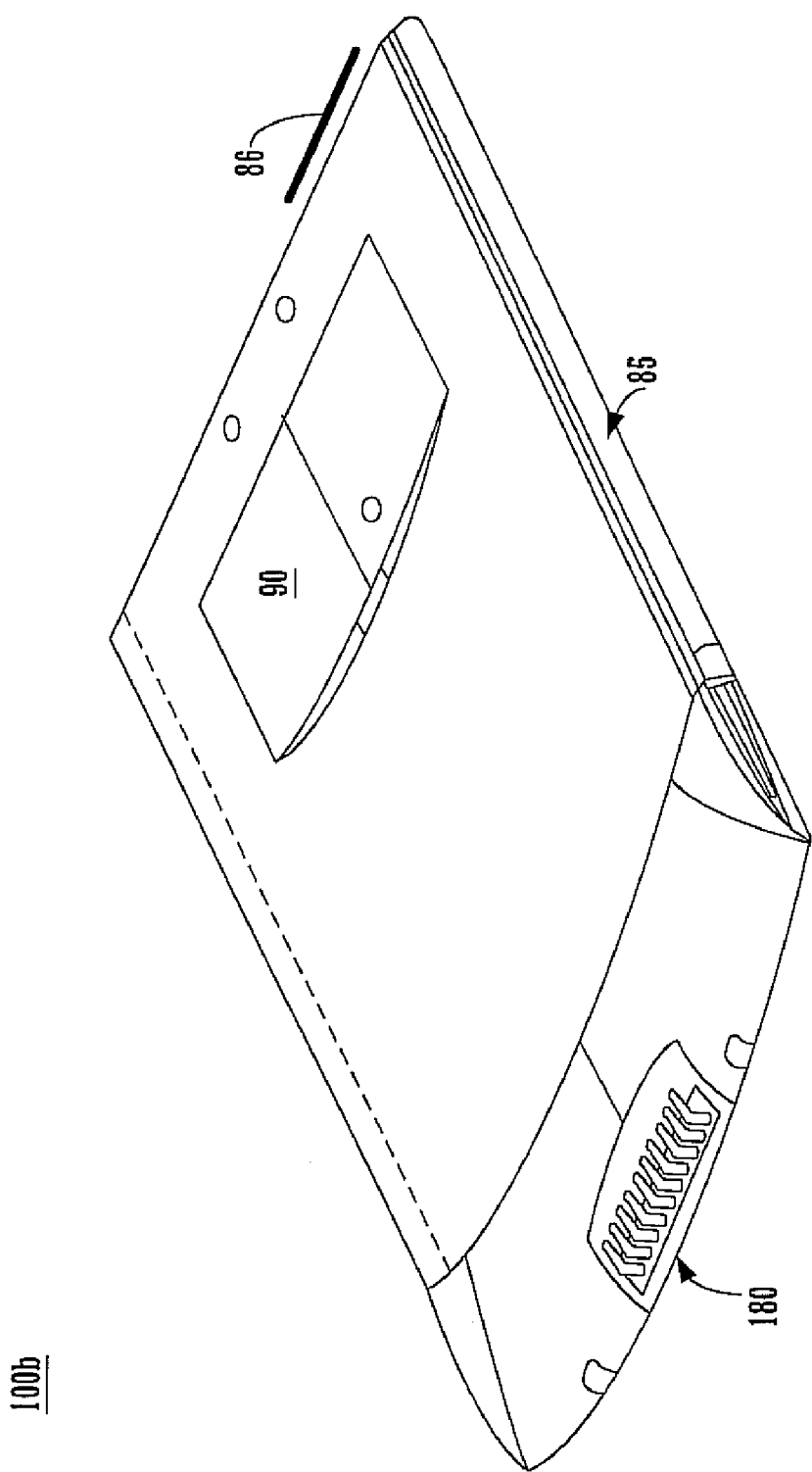
FIG. 2B is a bottom side perspective view of the Personal Digital Assistant computer system of FIG. 2A in accordance with one embodiment of the present invention.

FIG. 2B illustrates the bottom side 100b of one embodiment of Personal Digital Assistant computer system 100. An optional extendible antenna 85 is shown, and a battery storage compartment door 90 is shown as well. A communication interface 108 is also shown. In one embodiment of the present invention, the serial communication interface 108 comprises a serial communication port, but it could also alternatively be of any of a number of well known communication standards and protocols, e.g., parallel, small computer system interface (SCSI), Ethernet, Firewire (IEEE 1394), etc.

Figure 3:
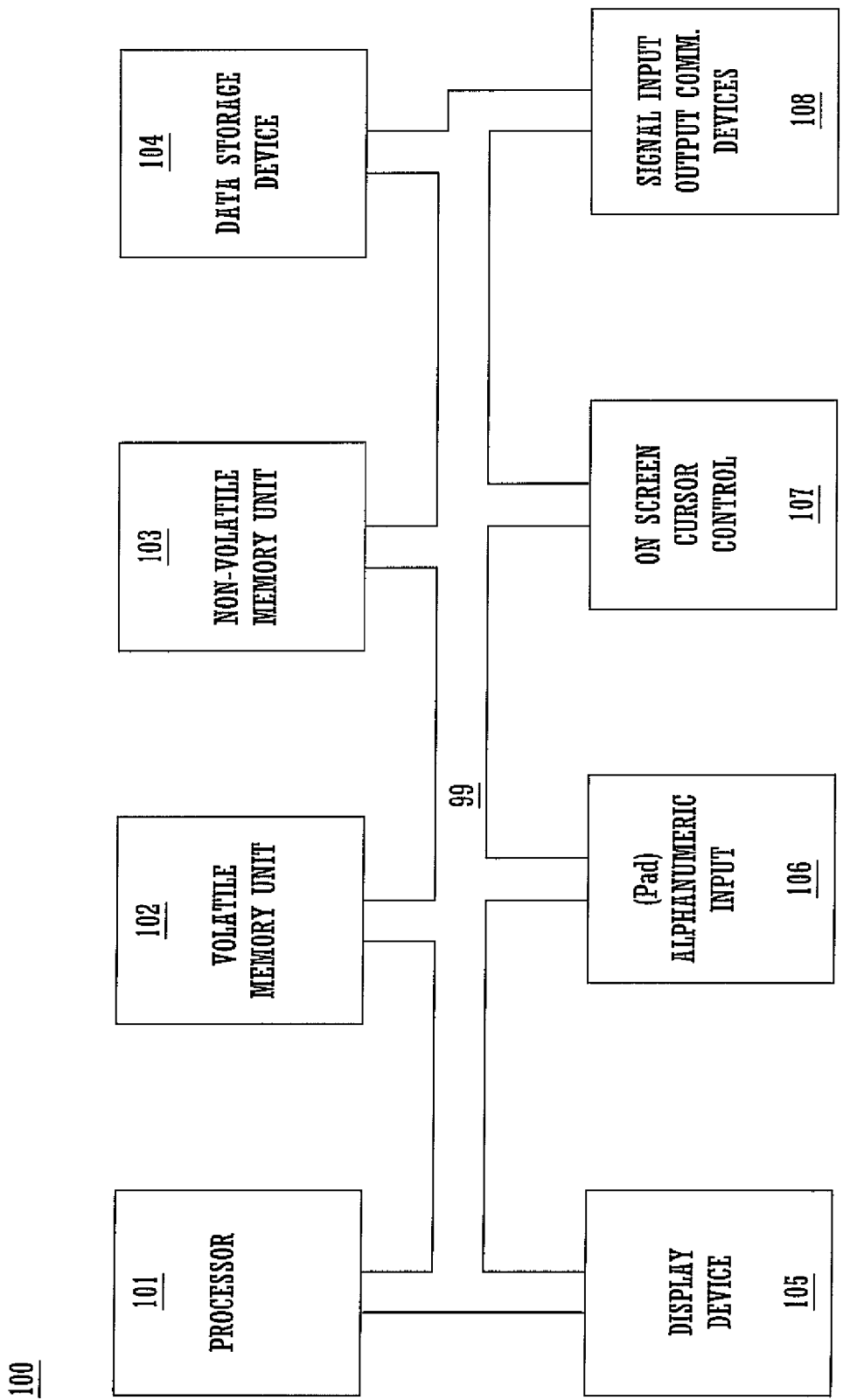
FIG. 3 is a logical block diagram of circuitry located within the exemplary Personal Digital Assistant computer system of FIG. 2A in accordance with one embodiment of the present invention.

Referring now to FIG. 3, a block diagram of exemplary Personal Digital Assistant computer system 100 is shown. Computer system 100 includes an address/data bus 99 for communicating information, a central processor 101 coupled with bus 99 for processing information and instructions, a volatile memory unit 102 (e.g., random access memory, static RAM, dynamic RAM, etc.) coupled with bus 99 for storing information and instructions for central processor 101 and a non-volatile memory unit 103 (e.g., read only memory, programmable ROM, flash memory, EPROM, EEPROM, etc.) coupled with bus 99 for storing static information and instructions for processor 101. As described above, computer system 100 also contains a display device 105 coupled to bus 99 for displaying information to the computer user.

Moreover, computer system 100 also includes a data storage device 104 (e.g., a removable memory device) for storing information and instructions. In one embodiment, data storage device 104, or a portion thereof, is removable from computer system 100. Removable memory 104 may be any of a number of well known removable media, such as a Memory-Stick™, a secure digital (SD) card, a multi-media (MMC) card, a compact flash (CF) card, SmartMedia card, etc., and the like.

Also included in computer system 100 of FIG. 3 is an optional alphanumeric input device 106 which, in one implementation, is a handwriting recognition pad ("digitizer") having regions 106a and 106b (FIG. 2A), for instance. Device 106 can communicate information and command selections to central processor 101. Computer system 100 also includes an optional cursor control or directing device 107 coupled to bus 99 for communicating user input information and command selections to central processor 101. In one implementation, device 107 is a touch screen device incorporated with screen 105. In this implementation, device 107 is capable of registering a position on screen 105 where a stylus makes contact. Display device 105 utilized with computer system 100 may be a liquid crystal device (LCD), cathode ray tube (CRT), field emission device (FED, also called flat panel CRT) or other display device suitable for creating graphic images and alphanumeric characters recognizable to the user. In a currently preferred embodiment, display 105 is a flat panel display. Computer system 100 also includes signal communication interface 108, which is also coupled to bus 99, and can be a serial port for communicating with cradle 60. Communication interface 108 can also include number of wireless communication mechanisms such as infrared or a Bluetooth protocol.

It is appreciated that computer system 100 described herein illustrates an exemplary configuration of an operational platform upon which embodiments of the present invention can be implemented. Nevertheless, other computer systems with differing configurations can also be used in place of computer system 100 within the scope of the present invention.

Figure 4:
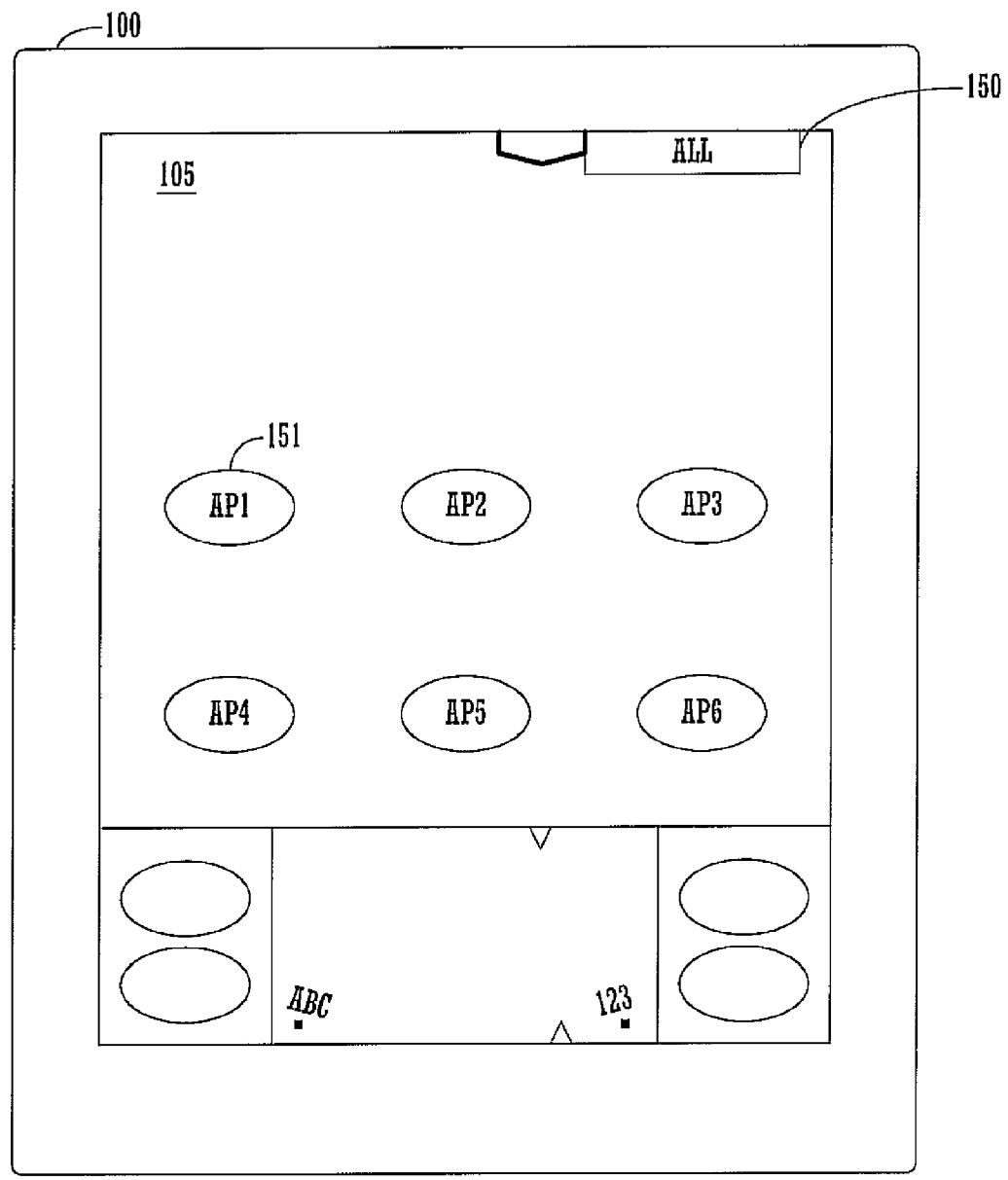
FIG. 4 is an illustration of a Personal Digital Assistant having a plurality of applications under the "ALL" category in accordance with one embodiment of the present invention.

FIG. 4 is an illustration of a Personal Digital Assistant (PDA) 100 that comprises a plurality of information files, e.g., applications, data, documents, configuration information, etc., hereinafter, "files." The files may contain applications that are programs such as games, an address book, or calendar, etc. On PDA 100, there is a drop-down menu 150 that comprises the different categories where files can be stored. Each file can be assigned to a category name. The user can create new category names, or amend existing names, in well known fashions. In accordance with the embodiments of the present invention, the user can define categories that relate only to storage on removable memory devices, e.g., expansion cards. Generally, by associating a file (stored in non-removable memory) with a category name of the removable memory, that file becomes copied to the removable memory. Vice-versa, by associating a file (stored in removable memory) with a category name of the non-removable memory, that file becomes copied to the non-removable memory.

In this particular illustration of FIG. 4, drop-down menu 150 reads "All." This selection will display information in all categories, e.g., icons of all of the files that are stored on PDA 100 including any information stored in the currently inserted expansion memory card 104 (FIG. 3). In this example, only application files are stored. For example, application AP1 151 is displayed as an icon on the PDA. AP1 151 is an application that resides in one of the categories of drop-down menu 150. Also shown are other applications represented as icons AP2-AP6.

Figure 5:
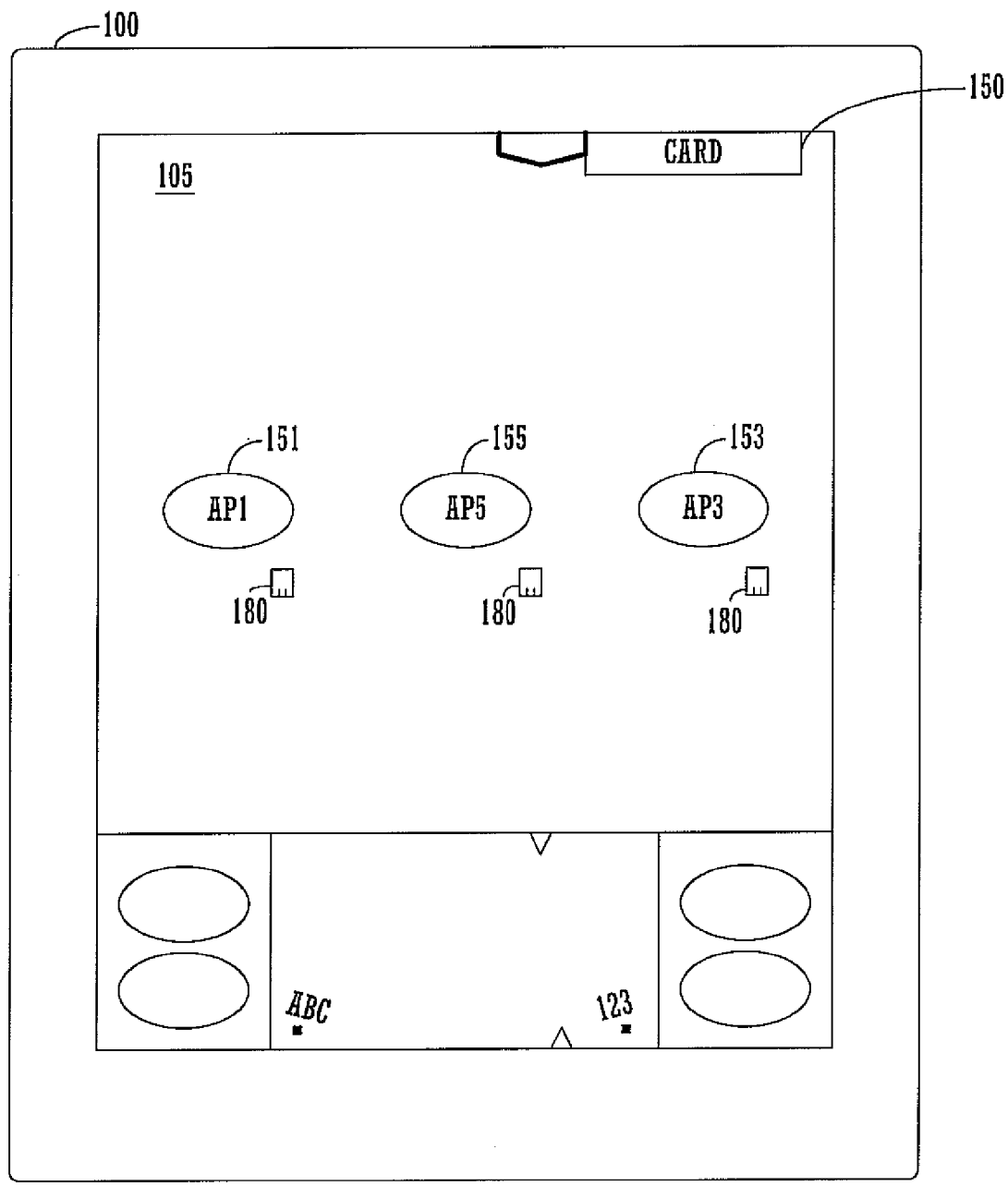
FIG. 5 is an illustration of a Personal Digital Assistant having a plurality of applications in a category named "card" which denotes a removable storage memory device in accordance with one embodiment of the present invention.

FIG. 5 is an illustration of PDA 100 having a plurality of applications that are stored in the category "card." To display the files stored in the category "card," the user selects the label "card" from the drop-down menu 150. For descriptive purposes, "card" represents a category of files associated with the removable storage card. In one embodiment, once selected, only icons of the files stored in the "card" category will be displayed for easy user reference. In this embodiment, the category named "card" represents the removable storage unit 104 (FIG. 3). As shown, applications 151, 155 and 153 are displayed on the computer screen 105 and relate to the files that are stored in the removable storage device 104.

In one embodiment, a removable storage card can have more than one category associated with the card. In another embodiment, the files stored on other removable storage cards (not inserted into the PDA) can be displayed upon the user selecting a category associated with those memories. However, the icons, in this case, will be displayed with visual attributes (such as being grayed out) to prevent the user form selecting those applications.

By having the removable storage unit 104 represented by a category in the drop-down menu 150, the present invention allows the user to use the category technique of storing data on PDA 100 to move data onto removable storage unit 104. In one embodiment, icon 180 is displayed next to the application icon to remind the user that the application is on the removable storage unit 104. For example, application AP1 151 has icon 180 next to the lower right corner of the icon for AP1 151. Icon 180 signals the user that the application is stored on the removable storage unit 104. Furthermore, category label 150 "card," can be displayed with a special display attribute (or associated icon) indicating that this category includes information that is stored on the memory card.

Figure 6:
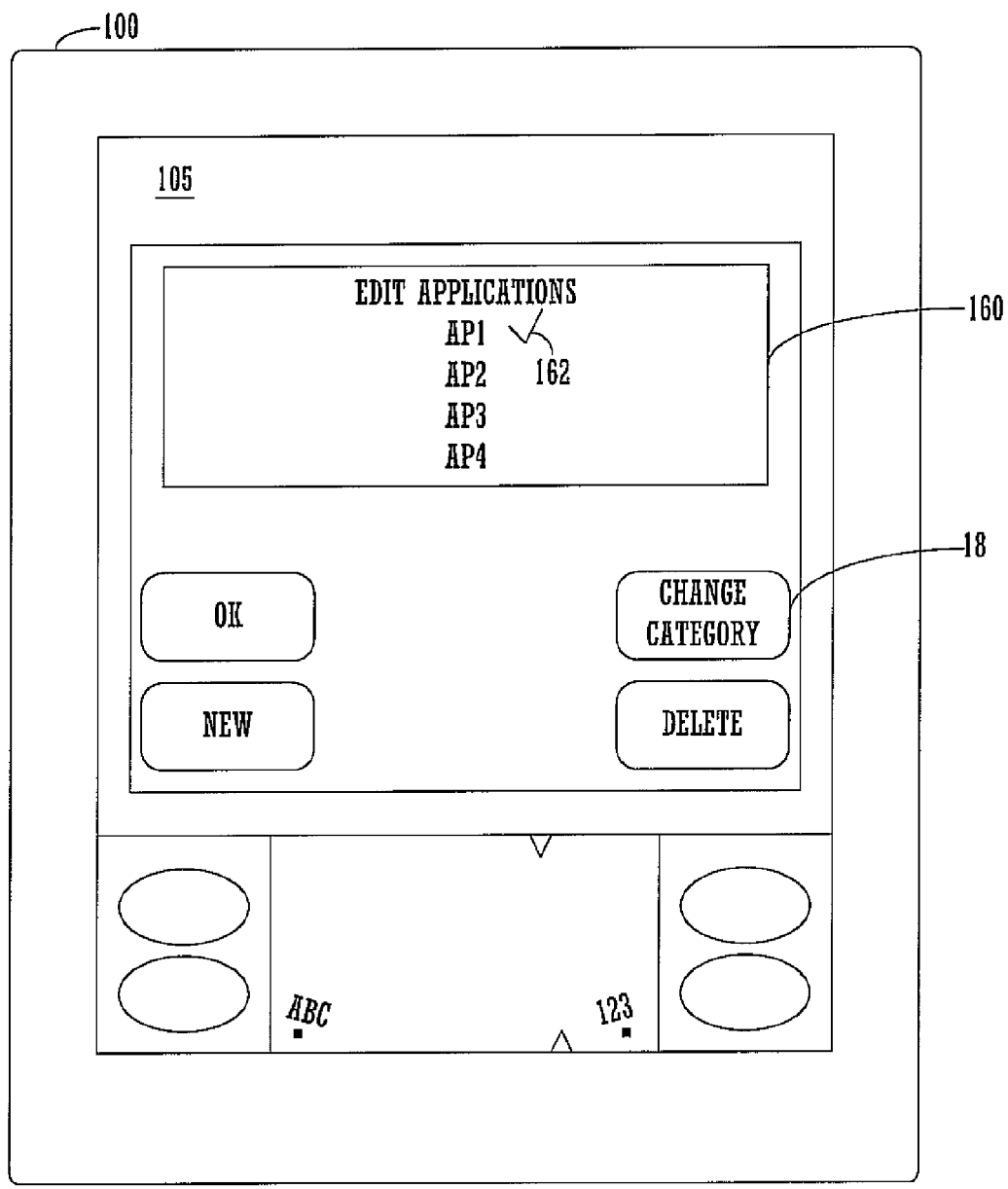
FIG. 6 is an illustration of a Personal Digital Assistant having a function that edits the category of an application on a Personal Digital Assistant in accordance with one embodiment of the present invention.

FIG. 6 is an illustration of a PDA 100 having a function that edits the category of a file (e.g., application) on system 100 and by doing so is able to automatically move or "copy" the data. Dialog window 160 shows the files that are stored on PDA 100. Below the dialog box 160, there are numerous options for manipulating the category in which an application resides. For example, if the user wanted to copy the application AP4 from the main memory 102 to the removable storage unit 104, the user would change the category of AP4 from its current category e.g., "games," to a new category associated with the removable card, e.g., "card." To do this, an application can be selected, and the change category button 18 can be selected to bring up a new dialog box as described in FIG. 7. Alternatively, if a user wanted to "copy" an application from a removable storage card to the main memory of the PDA, the application would be selected, and the file's category can be changed from a category associated with the removable memory to a category associated with the main memory of the PDA.

In one embodiment, an attribute is associated with file names and/or the category names in the various drop-down menus, e.g., menu 160 (FIG. 6 or menu 150 of FIG. 10) to indicate removable memory storage. For example, if an application in the drop-down menu resides on the removable memory card, a check mark 162 (FIG. 6) can be placed next to the name associated with the application to remind the user that the application is stored on the removable memory card. Furthermore, with respect to an application in the drop-down menu that is stored on a removable storage card not coupled to the PDA, the name associated with the application can be grayed out or italicized so the user is not able to select the application and to alert the user that the application is stored on a non-inserted removable memory card.

Figure 10:
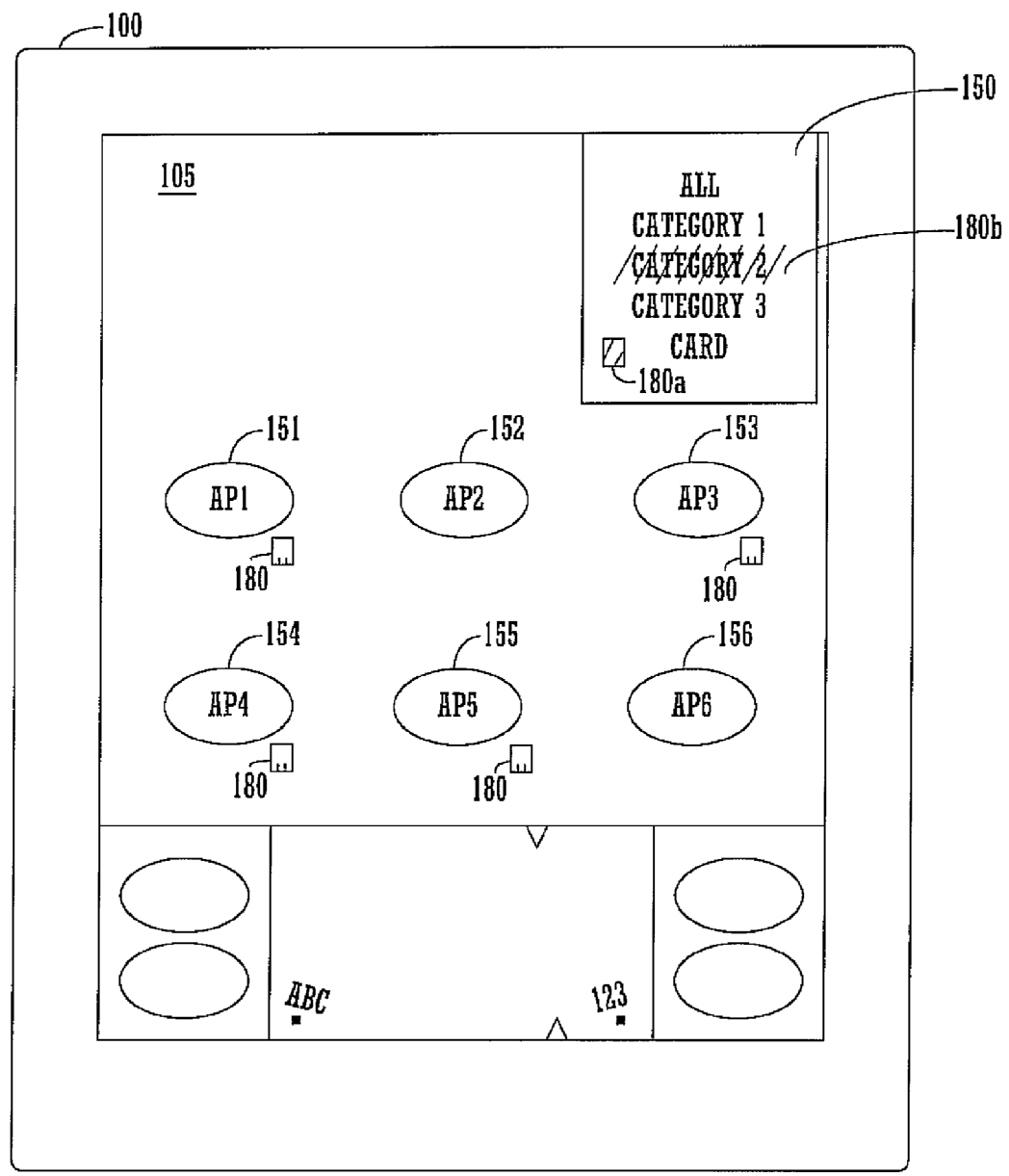
FIG. 10 is an illustration of a Personal Digital Assistant comprising a plurality of applications that reside on main memory and removable memory in accordance with one embodiment of the present invention.

Regarding, category names, FIG. 10 illustrates drop down menu 150. Category "Card" has an icon 180a to indicate that this category is related to removable storage. Furthermore, a category 180b in the drop-down menu 150 that is related to information stored on a removable storage card that is not presently coupled to the PDA, is grayed out or italicized so the user is not able to select that category. In another embodiment, a category can be password protected to prevent unauthorized use. In another embodiment, a password protected category can also be grayed out to prevent the user from selecting a particular application.

Figure 7:
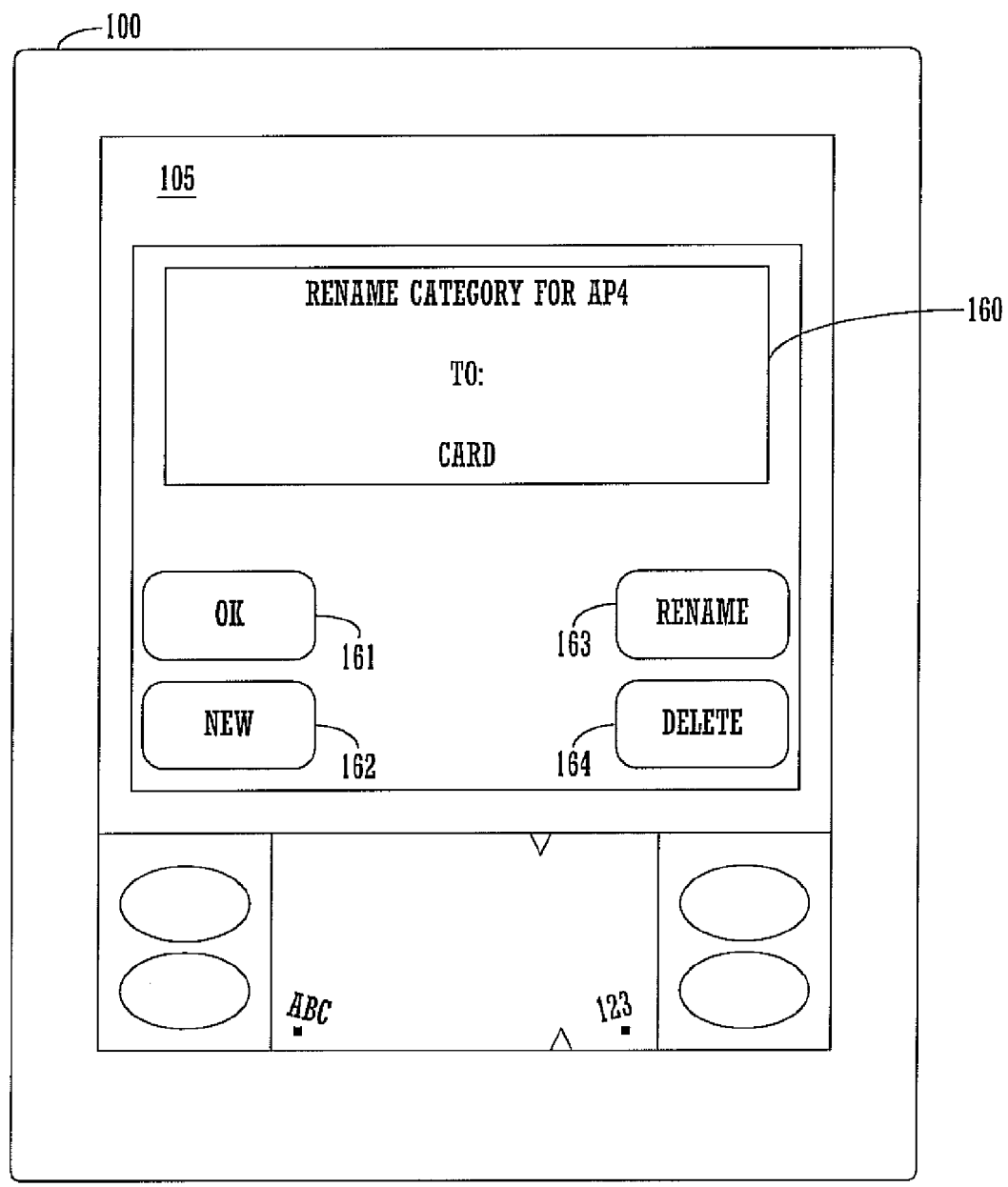
FIG. 7 is an illustration of the process of renaming the category of an application on a Personal Digital Assistant in accordance with one embodiment of the present invention.

FIG. 7 is an illustration of a PDA 100 in the process of renaming a file's category. Notice dialog box 160 wherein the text notifies the user that the category that AP4 is in is about to be changed to "card." At this point in the process, the user would select the OK button 161 to affirm the change of category. In one embodiment, once the category of the file is changed to the removable memory, the file, e.g., application, is automatically copied from its original memory space to the removable memory card. The name "card" that is given to the category representing the removable memory 104 is only a genetic term used for descriptive purposes. The exact name of the category may be any name assigned to the card by the user or software used for embodiments of the present invention.

Figure 8:
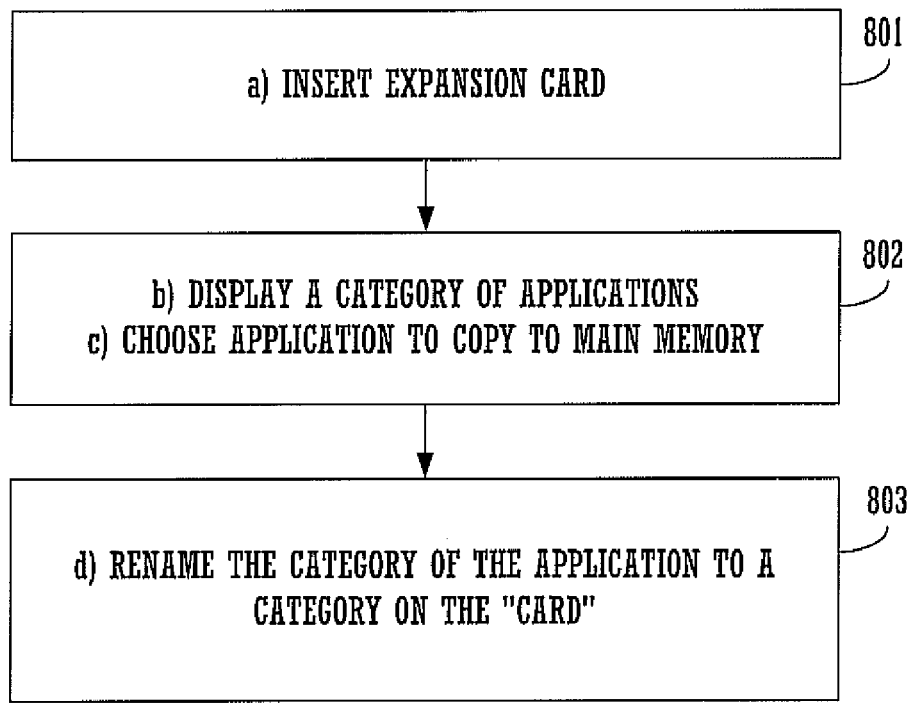
FIG. 8 is a flow chart illustrating the process of changing the category of an application from a given category to the "card" category in order to copy the application to a removable storage device in accordance with one embodiment of the present invention.

FIG. 8 illustrates a process 800 that can be implemented as program code stored in computer readable memory units of a computer system and executed by the processor of the computer system. Although a variety of different computer systems can be used with the present invention, an exemplary Personal Digital Assistant computer system. FIG. 8 is a process flow chart 800 that illustrates the process of copying a file, e.g., an application, from the main memory 102 or 103 on PDA 100 to removable memory 104 (FIG. 3). Step 801 is to insert the memory card 104 into the PDA 100. The next step 802 is to display a category of files where the category relates to information stored on memory 102 or memory 103. Next, the user selects the application (of a category that includes information stored in memory 102 or memory 103) that is going to be copied to the removable memory card 104. Once the application has been selected, the step 803 is to change the category to which the application is assigned to a category associated with the removable memory device. By changing the category of the application to "card," the application will be automatically copied to the removable memory card 104.

Figure 9:
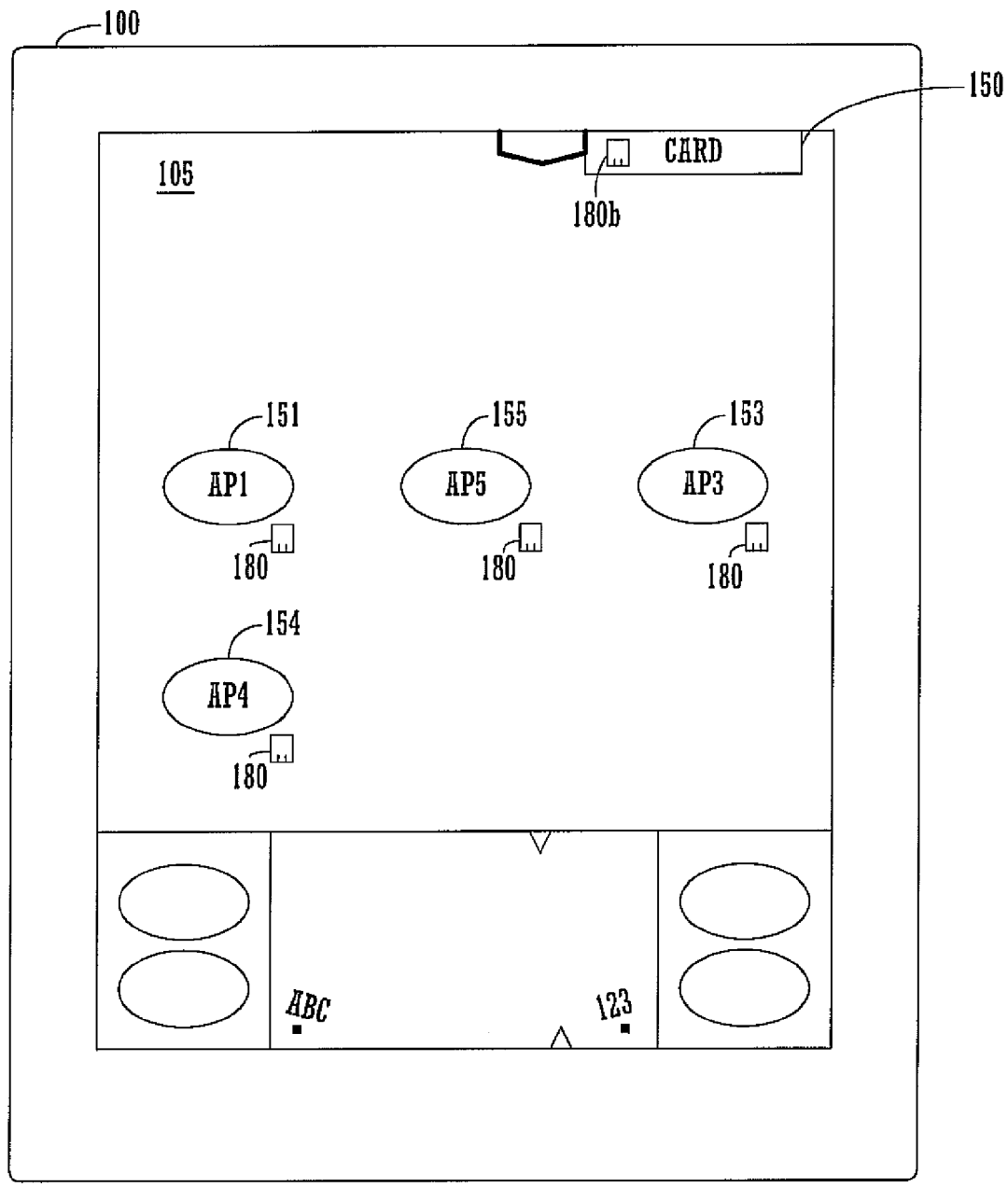
FIG. 9 is an illustration of the contents of a category after an application has been copied to the category in accordance with one embodiment of the present invention.

FIG. 9 is an illustration of a PDA 100 comprising several files, e.g., applications, that are stored on the removable memory card 104 as a result of copying AP4 154 to the removable memory card. Notice that drop-down menu 150 displays "card" as the selected category. Optional icon 180b is present to denote that the associated category relates to a removable storage device. The category named "card" comprises files AP1 151, AP5 155, AP3 153 and AP4 154. The icons 180 that are next to the application icons are to remind the user that the applications are located on the removable memory 104 (FIG. 3). Referring back to FIG. 5, notice that there are only 3 applications in the "card" category (AP1 151, AP3 153, and AP5 155). Referring back to FIG. 9, notice that after changing the category of AP4 154 to "card," AP4 154 is now included in the category called "card.

FIG. 10 is an illustration of PDA 100 after changing the category in the drop-down menu 150 to "all." Notice that the same six applications are displayed as in FIG. 4. However, icon 180 allows easy recognition of the files, e.g., applications, that are stored on the removable memory. For example, in FIG. 10, AP1, AP3, AP4 and AP5 have icon 180 next to them indicating that they are stored on the removable memory 104 (FIG. 3). Also note in drop down window 150 that icon 180a is displayed next to the card label within window 150. This also reminds the user that this category "card" relates to a removable memory.

Figure 11:
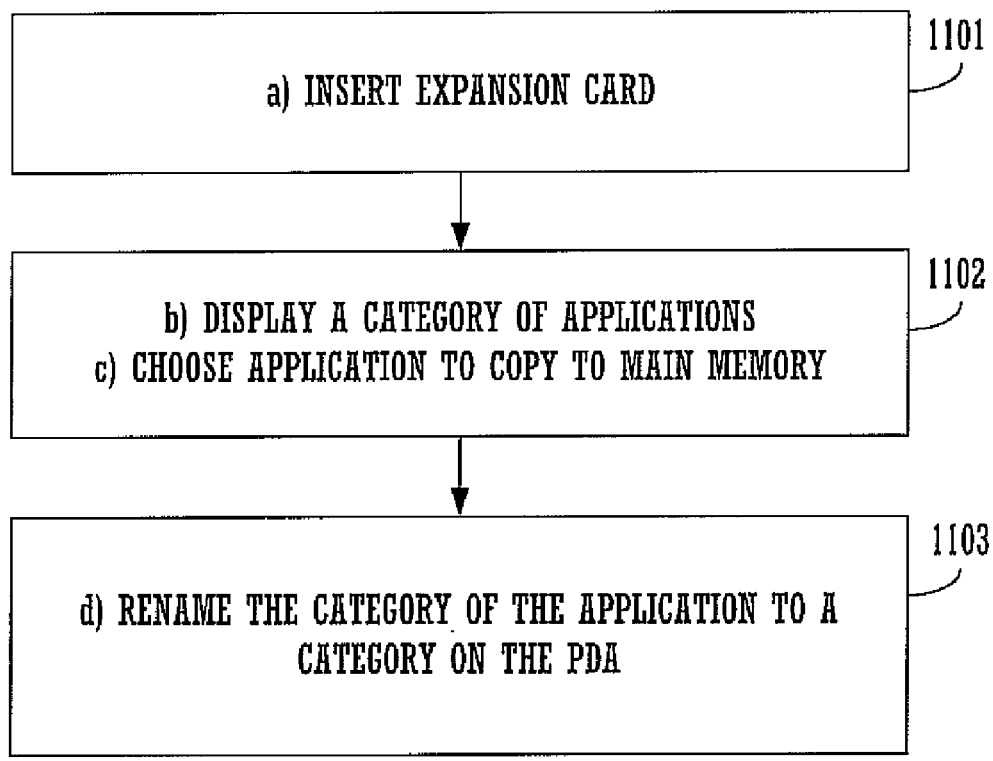
FIG. 11 is flow chart illustrating a process of changing the category of an application to a category stored on the main memory of a Personal Digital Assistant in accordance with one embodiment of the present invention.

FIG. 11 is a flow chart 1100 that describes the process of copying a file, e.g., an application, from the removable memory 104 (FIG. 3) to the main memory of the PDA 100.

The steps are analogous to the steps in process 800 (FIG. 8) except the name of the category is changed from "card" to a category that resides on the main memory of the PDA 100. For example, the first step 1101 of process 1100 is to insert the expansion card (removable memory 104 of FIG. 3) into the PDA 100. The next step 1102 is to display a category that includes information displayed in the inserted expansion card then choose the application that is to be copied from the PDA 100 to the removable memory 104. Lastly, in step three 1103, the category of the application is changed to the category that represents the expansion card 104.

Figure 12:
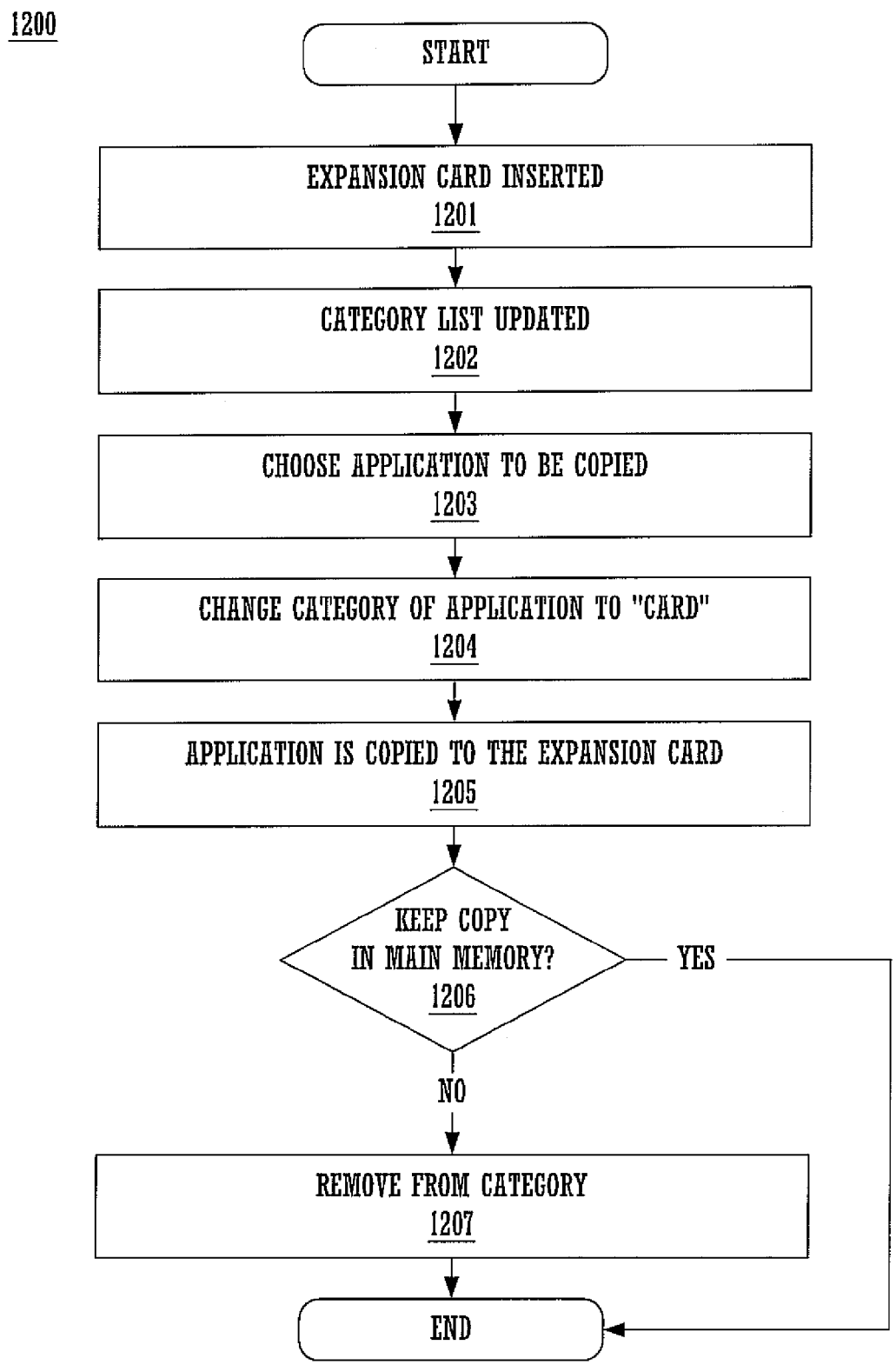
FIG. 12 is a flow chart illustrating a process of copying an application from a removable memory to the main memory of a Personal Digital Assistant in accordance with one embodiment of the present invention.

FIG. 12 is a flow chart 1200 that represents an embodiment of the present invention that allows the user to keep a copy of a file in two different categories. For example, when an application is copied from the PDA 100 to an expansion card 104, the user has the option to keep both copies or just move it form one category to another (e.g., eliminating the original copy).

The first step 1201 of process 1200 is to insert the expansion card into the PDA. Next, the category list is updated to represent the card as a new category. In the category list, the card may be named "card" or it may be the name the user created for the card such as "games" or "address book." The next step 1203 is to choose the application that is to be copied. Then the next step 1204 is to change the category of the application to the category that represents the removable memory card. Next in step 1205, the application is copied from the main memory of the PDA to the expansion card. Once completed, in step 1206, a dialog box will appear and ask the user if the application is to remain in the original category in addition to the expansion card. If the user answers "yes," the process is complete. If the user answers "no," in step 1207, the application that was copied will be removed from the category it was in prior to being copied.

If an application was to be copied from an expansion card to the PDA, the steps would be similar except the category would be changed from the category that represents the card to a category that is on the main memory of the PDA. The similar operation of copying files makes it very easy for the user to copy and move applications from removable memory to the PDA.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of copying a file, said method comprising:
   storing a plurality of location identifiers that comprise: a location identifier of a removable memory; and a location identifier of a memory of a portable electronic device;
   storing said file in a memory of said portable electronic device, wherein said file is associated with said location identifier of said memory;
   in response to a user interaction with a user interface of said portable electronic device, associating said location identifier of said removable memory with said file, wherein said user interaction comprises a user selection of said file to copy; and
   in response to said associating said location identifier of said removable memory with said file, copying said file from said memory of said portable electronic device to said removable memory.

2. The method of claim 1, wherein said removable memory is selected from a group consisting of a SD (secure digital) card, a MMC (multi-media card), a compact flash (CF) card, and a SmartMedia card.

3. The method of claim 1 further comprising:
   displaying said plurality of location identifiers on a display device of said portable electronic device.

4. The method of claim 3, wherein said displaying said plurality of location identifiers further comprises displaying a plurality of visual indicators, wherein each visual indicator of said plurality of visual indicators is associated with a respective location identifier of said plurality of location identifiers, and wherein said plurality of visual indicators are selected from a group consisting of text and icons.

5. The method of claim 3, wherein said displaying further comprises displaying, in response to a coupling of said removable memory with said portable electronic device, said location identifier of said removable memory.

6. The method of claim 1, wherein said file is selected from at least one file displayed on a display of said portable electronic device, wherein said at least one file is represented by a visual indicator selected from a group consisting of text and an icon.

7. The method of claim 1 further comprising:
   displaying a visual indicator associated with said file, wherein said visual indicator associated with said file indicates that said file resides on said removable memory after said copying.

8. A non-transitory computer-usable medium having computer-readable program code embodied therein for causing a computer system to perform a method of copying a file, said method comprising:
   storing a plurality of location identifiers that comprise: a location identifier of a removable memory; and a location identifier of a memory of a portable electronic device;
   storing said file in a memory of said portable electronic device, wherein said file is associated with said location identifier of said memory;
   in response to a user interaction with a user interface of said portable electronic device, associating said location identifier of said removable memory with said file, wherein said user interaction comprises a user selection of said file to copy; and
   in response to said associating said location identifier of said removable memory with said file, copying said file from said memory of said portable electronic device to said removable memory.

9. The computer-usable medium of claim 8, wherein said removable memory is selected from a group consisting of a SD (secure digital) card, a MMC (multi-media card), a compact flash (CF) card, and a SmartMedia card.

10. The computer-usable medium of claim 8, wherein said method further comprises:
    displaying said plurality of location identifiers on a display device of said portable electronic device.

11. The computer-usable medium of claim 10, wherein said displaying said plurality of location identifiers further comprises displaying a plurality of visual indicators, wherein each visual indicator of said plurality of visual indicators is associated with a respective location identifier of said plurality of location identifiers, and wherein said plurality of visual indicators are selected from a group consisting of text and icons.

12. The computer-usable medium of claim 10, wherein said displaying further comprises displaying, in response to a coupling of said removable memory with said portable electronic device, said location identifier of said removable memory.

13. The computer-usable medium of claim 8, wherein said file is selected from at least one file displayed on a display of said portable electronic device, wherein said at least one file is represented by a visual indicator selected from a group consisting of text and an icon.

14. The computer-usable medium of claim 8, wherein said method further comprises:
displaying a visual indicator associated with said file, wherein said visual indicator associated with said file indicates that said file resides on said removable memory after said copying.

15. A system comprising a portable electronic device comprising a processor coupled to a memory and a removable memory, wherein said memory comprises instructions that when executed by said processor implement a method of copying a file, said method comprising:
storing a plurality of location identifiers that comprise: a location identifier of said removable memory; and a location identifier of said memory of said portable electronic device;
storing said file in either said removable memory or said memory of said portable electronic device, wherein said file is associated with one of said location identifiers depending on whether said file is stored in said removable memory or said memory of said portable electronic device;
in response to a user interaction with a user interface of said portable electronic device, changing said location identifier associated with said file, wherein said user interaction comprises a user selection of said file to copy; and
in response to said changing said location identifier of said removable memory with said file, copying said file from a current memory location to that memory corresponding to the changed location identifier.

16. The system of claim 15, wherein said removable memory is selected from a group consisting of a SD (secure digital) card, a MMC (multi-media card), a compact flash (CF) card, and a SmartMedia card.

17. The system of claim 15, wherein said method further comprises:
displaying said plurality of location identifiers on a display device of said portable electronic device.

18. The system of claim 17, wherein said displaying said plurality of location identifiers further comprises displaying a plurality of visual indicators, wherein each visual indicator of said plurality of visual indicators is associated with a respective location identifier of said plurality of location identifiers, and wherein said plurality of visual indicators are selected from a group consisting of text and icons.

19. The system of claim 17, wherein said displaying further comprises displaying, in response to a coupling of said removable memory with said portable electronic device, said location identifier of said removable memory.

20. The system of claim 15, wherein said file is selected from at least one file displayed on a display of said portable electronic device, wherein said at least one file is represented by a visual indicator selected from a group consisting of text and an icon.

21. The system of claim 15, wherein said method further comprises:
displaying a visual indicator associated with said file, wherein said visual indicator associated with said file indicates that said file resides on said removable memory after said copying.

22. A method of copying a file, said method comprising:
storing a plurality of location identifiers that comprise: a location identifier of a removable memory; and a location identifier of a memory of a portable electronic device;
storing said file in a removable memory that is in communication with said portable electronic device, wherein said file is associated with said location identifier of said removable memory;
in response to a user interaction with a user interface, associating said location identifier of said memory of said portable electronic device with said file, wherein said user interaction comprises a user selection of said file to copy; and
in response to said associating said location identifier of said memory of said portable electronic device with said file, copying said file from said removable memory to said memory of said portable electronic device.

23. The method of claim 22, wherein said removable memory is selected from a group consisting of a SD (secure digital) card, a MMC (multi-media card), a compact flash (CF) card, and a SmartMedia card.

24. The method of claim 22 further comprising:
displaying said plurality of location identifiers on a display device of said portable electronic device.

25. The method of claim 24, wherein said displaying said plurality of location identifiers further comprises displaying a plurality of visual indicators, wherein each visual indicator of said plurality of visual indicators is associated with a respective location identifier of said plurality of location identifiers, and wherein said plurality of visual indicators are selected from a group consisting of text and icons.

26. The method of claim 24, wherein said displaying further comprises displaying, in response to a coupling of said removable memory with said portable electronic device, said location identifier of said removable memory.

27. The method of claim 22, wherein said file is selected from at least one file displayed on a display of said portable electronic device, wherein said at least one file is represented by a visual indicator selected from a group consisting of text and an icon.

28. The method of claim 22 further comprising:
displaying a visual indicator associated with said file, wherein said visual indicator associated with said file indicates that said file resides on said memory.

29. A non-transitory computer-usable medium having computer-readable program code embodied therein for causing a computer system to perform a method of copying a file, said method comprising:
storing a plurality of location identifiers that comprise: a location identifier of a removable memory; and a location identifier of a memory of a portable electronic device;
storing said file in a removable memory that is in communication with said portable electronic device, wherein said file is associated with said location identifier of said removable memory;
in response to a user interaction with a user interface, associating said location identifier of said memory of said portable electronic device with said file, wherein said user interaction comprises a user selection of said file to copy; and in response to said associating said location identifier of said memory of said portable electronic device with said file, copying said file from said removable memory to said memory of said portable electronic device.

30. The computer-usable medium of claim 29, wherein said removable memory is selected from a group consisting of a SD (secure digital) card, a MMC (multi-media card), a compact flash (CF) card, and a SmartMedia card.

31. The computer-usable medium of claim 29, wherein said method further comprises:

displaying said plurality of location identifiers on a display device of said portable electronic device.

32. The computer-usable medium of claim 31, wherein said displaying said plurality of location identifiers further comprises displaying a plurality of visual indicators, wherein each visual indicator of said plurality of visual indicators is associated with a respective location identifier of said plurality of location identifiers, and wherein said plurality of visual indicators are selected from a group consisting of text and icons.

33. The computer-usable medium of claim 31, wherein said displaying further comprises displaying, in response to a coupling of said removable memory with said portable electronic device, said location identifier of said removable memory.

34. The computer-usable medium of claim 29, wherein said file is selected from at least one file displayed on a display of said portable electronic device, wherein said at least one file is represented by a visual indicator selected from a group consisting of text and an icon.

35. The computer-usable medium of claim 29, wherein said method further comprises:

displaying a visual indicator associated with said file, wherein said visual indicator associated with said file indicates that said file resides on said memory.

36. A system comprising an electronic device comprising a processor coupled to a main memory and a removable memory, wherein said memory comprises instructions that when executed by said processor implement a method of copying a file, said method comprising:

in association with each file stored by either said main memory or said removable memory, storing an identifier, wherein, if said file is stored by said main memory, said identifier indicates a category of said file and, if said file is stored by said removable memory, said identifier indicated that said file is stored by said removable memory;

in response to a user interaction with a user interface, changing said identifier associated with said file; and in response to said changing said identifier associated with said file, copying said file from a current location to a location associated with said changed identifier.

37. The system of claim 36, wherein said removable memory is selected from a group consisting of a SD (secure digital) card, a MMC (multi-media card), a compact flash (CF) card, and a SmartMedia card.

38. The system of claim 36, wherein said method further comprises:

displaying said plurality of location identifiers on a display device of said portable electronic device.

39. The system of claim 38, wherein said displaying said plurality of location identifiers further comprises displaying a plurality of visual indicators, wherein each visual indicator of said plurality of visual indicators is associated with a respective location identifier of said plurality of location identifiers, and wherein said plurality of visual indicators are selected from a group consisting of text and icons.

40. The system of claim 38, wherein said displaying further comprises displaying, in response to a coupling of said removable memory with said portable electronic device, said location identifier of said removable memory.

41. The system of claim 36, wherein said file is selected from at least one file displayed on a display of said portable electronic device, wherein said at least one file is represented by a visual indicator selected from a group consisting of text and an icon.

42. The system of claim 36, wherein said method further comprises:

displaying a visual indicator associated with said file, wherein said visual indicator associated with said file indicates that said file resides on said memory.

43. The system of claim 36, wherein, if said identifier was changed from indicating a category of said file to indicating said removable memory, said file is copied from said main memory to said removable memory.

44. The system of claim 36, wherein if said identifier was changed from indicating a file stored by said removable memory, said file is copied from said removable memory to said main memory.

45. The system of claim 36, further comprising a drop-down menu as part of said user interface, said drop-down menu listing said identifiers and being used to change an identifier associated with a particular file.

46. The system of claim 36, wherein file names for files resident on a removable memory not currently in communication with said processor are listed in said user interface, but cannot be selected for changing an identifier associated therewith.

47. The system of claim 36, wherein, in response to changing said identifier associated with said file, said user interface prompts a user for an instruction as to whether a copy of said file is to remain in said current location with an unchanged identifier in addition to copying said file to a location associated with said changed identifier.

* * * * *

UNITED STATES PATENT AND TRADEMARK OFFICE
CERTIFICATE OF CORRECTION

PATENT NO. : 8,306,949 B2  Page 1 of 1
APPLICATION NO. : 12/552467
DATED : November 6, 2012
INVENTOR(S) : Jesse Donaldson It is certified that error appears in the above-identified patent and that said Letters Patent is hereby corrected as shown below:

In column 13, line 51, in Claim 36, delete "indicated" and insert -- indicates --, therefor.

Signed and Sealed this
Fifth Day of March, 2013

Teresa Stanek Rea
*Acting Director of the United States Patent and Trademark Office*